Jan. 26, 1937.  W. GUTZKE  2,068,744
PIEZO ELECTRICAL PRESSURE MEASURING DEVICE
Filed April 14, 1933

Inventor:

Patented Jan. 26, 1937

2,068,744

UNITED STATES PATENT OFFICE 2,068,744

PIEZO ELECTRICAL PRESSURE MEASURING DEVICE

Walther Gutzke, Berlin, Germany

Application April 14, 1933, Serial No. 666,135
In Germany April 15, 1932

1 Claim. (Cl. 177—351)

The subject matter of the invention is a piezo-electrical pressure-measuring device, which enables the variations in pressure that take place in the working cylinders of a prime mover to be followed in accurate manner.

The idea of employing piezo-electric crystals for measuring the pressure of explosions is known per se. The use of these measuring crystals, however, calls for a particular embodiment of the combustion chamber.

The subject matter of the invention is a pressure-measuring device, which may be fitted without difficulty to any cylinder of an internal combustion engine, which does not affect in any way the capacity of the cylinder, and in which the crystal is completely screened off against the combustion gases.

According to the invention, the piezo-electric crystals are arranged within the spark plugs themselves. The crystals, in accordance with the invention, are mounted in such fashion that the combustion gases have no access to the same, and that they are screened off electrically against the ignition current of the spark plug.

According to the invention, the crystals may be constructed in annular form, and disposed coaxially to the ignition pin. Naturally, however, it is also possible to employ crystal discs, and to arrange the same eccentrically in relation to the ignition pin. Further, it is also possible to employ a plurality of pairs of crystals. By a suitable connection system known per se it is then possible to obtain a by no means inconsiderable increase in the quartz charge.

Certain forms of embodiment of the invention are illustrated by way of example in the drawing.

Figure 1:
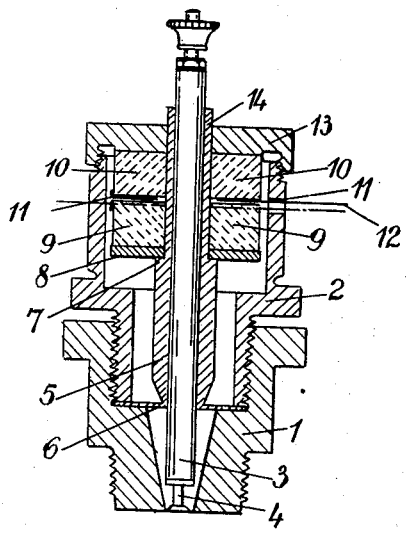
Fig. 1 shows a section through a spark plug, in which the crystals are constructed in the form of rings.

In the drawing 1 is the metallic body of the spark plug having the insulated ignition pin 4 and the ignition pin insulation 3. Fitted into this fundamental part is the diaphragm 6, which may consist, for example, of steel, and hermetically seals off the combustion chamber of the cylinder against the crystal space. The diaphragm 6 is firmly connected with the tubular member 5, which possesses a bearing surface 7 for the pressure ring 8, and at the same time electrically screens off the piezo-electric crystals 9, 10 against the ignition pin 4. The diaphragm 6 is fitted in the body 1 and secured by means of the threaded hollow member 2, if necessary with the interposition of a washer. The insulating member 3 with the ignition pin 4 is fitted in the metallic sleeve 5 and connected with the same in gas-tight fashion, for example by means of cement or the like. The insulating member 3 may conveniently be constructed in slightly conical form, whereby sealing is facilitated to a by no means inconsiderable degree.

Figure 2:
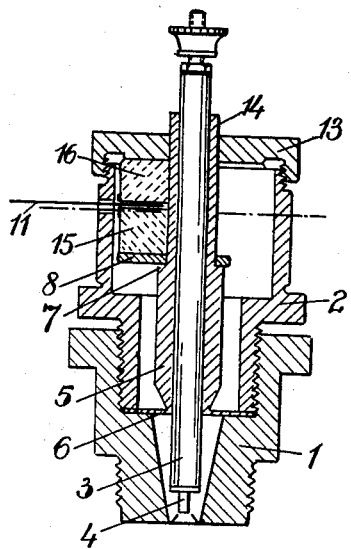
Fig. 2 shows a form of embodiment, in which the pressure-measuring element consists of a pair of crystal discs.
Figure 3:
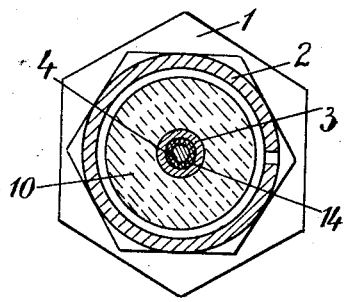
Figs. 3 and 4 show sections taken through Figs. 1 and 2 in the plane of the crystals.
Figure 4:
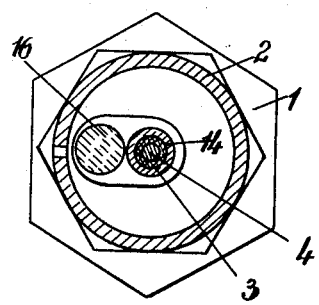
Figure 5:
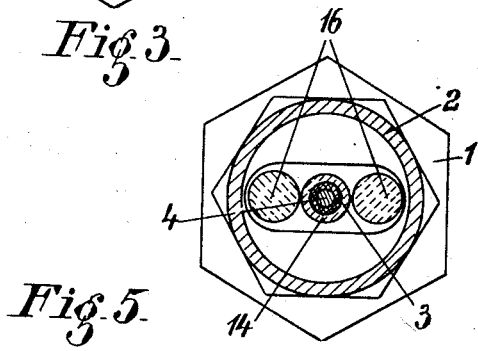
Fig. 5 is a corresponding section through a spark plug having two pairs of crystals.

After the diaphragm has been introduced together with the metallic member 5 the pressure ring 8 is placed over the bearing surface 7. On the pressure ring 8 there are arranged the piezo-electric crystals 9 and 10 with the intermediately disposed electrode 11, and these are pressed firmly against the base by the threaded cover 13. By suitably tightening the screw connections it is possible to produce in reliable fashion an absolutely secure connection of all parts and an absolutely gas-tight closure. In Figs. 1 and 3 the crystals 9 and 10 are constructed in the form of rings, which concentrically surround the ignition pin 4. In the arrangements according to Figs. 2, 4 and 5 the crystal rings are replaced by crystal discs 15 and 16. In all other respects these arrangements may be embodied to correspond with the arrangement as described in detail according to Fig. 1.

Naturally other forms of embodiment of the arrangement according to the invention are quite conceivable. It is essential as regards the invention that the crystals are arranged within the spark plugs themselves in a space which is sealed off in gas-tight fashion against the combustion gases, that the same are properly screened off electrically against the ignition current, and that the pressure is transmitted to the crystals with the assistance of a diaphragm and with the interposition of a pressure member, which at the same time may act as screening means and carry the insulated ignition pin.

It is furthermore essential that the bearing surface and the cover surface, which hold the crystals together with a certain tensional pressure, are simultaneously constructed as leakage conductance for the crystals resting against mass.

I claim:

A combined spark plug and engine indicator in the form of a normal spark plug comprising a hollow metallic body with a shoulder, a second hollow metallic member threaded in said first body, a metallic diaphragm fitted on said shoulder of said first body and pressed firmly on said shoulder by said threaded in member, a metallic tubular member, the lower end of which being firmly connected with said diaphragm, the upper end of which possessing a bearing surface and containing an insulated ignition pin, extending through said diaphragm from the combustion space to the electric connection means, said diaphragm hermetically sealing off a hollow space against the combustion chamber of the cylinder, said hollow space containing piezo-electric crystals constructed in the form of rings concentrically surrounding said ignition pin and pressed between a pressure ring placed over said bearing surface and a threaded cover, said piezo-electric device screened off electrically by said two metallic bodies, said metallic tubular member and said diaphragm.

WALTHER GUTZKE.